Sept. 16, 1924.

J. I. NASMITH

TOOL FOR SCORING CARDBOARD AND THE LIKE

Filed Aug. 24, 1921

1,508,709

Patented Sept. 16, 1924.

1,508,709

UNITED STATES PATENT OFFICE.

JOHN IRVING NASMITH, OF ELTHAM, ENGLAND, ASSIGNOR TO VICKERS LIMITED, OF WESTMINSTER, LONDON, ENGLAND, A BRITISH COMPANY.

TOOL FOR SCORING CARDBOARD AND THE LIKE.

Application filed August 24, 1921. Serial No. 494,991.

*To all whom it may concern:*

Be it known that I, JOHN IRVING NASMITH, a subject of the King of Great Britain, of 12 Glenshiel Road, Eltham, in the county of Kent, England, have invented certain new and useful Improvements in or Relating to Tools for Scoring Cardboard and the like, of which the following is a specification.

This invention relates to devices or tools for scoring cardboard or the like and has general reference to such tools of the kind in which the tool body is mounted on an angularly movable supporting rail and carries a pivoted cutter frame which can be adjusted on the said body so that the cutter or knife supported in the said frame can be set according to the required depth of cut.

According to this invention the pivoted cutter frame and the member in contact therewith for adjusting the same on its pivot are so constructed and arranged that the thrust on the said member due to the cutting pressure is in a direction normal to the supporting rail. For this purpose the adjusting member for moving the pivoted cutter frame is in the form of a pivoted bell crank adapted to be rocked on its pivot to adjust the cutter frame, by means of a transversely arranged screw, the said cutter frame being adapted to co-operate with a spring preferably disposed at the forward and pivoted end of the said frame so as to maintain the frame in contact with the aforesaid bell crank adjusting member.

In order that the invention may be clearly understood and readily carried into effect the same will now be more fully described with reference to the accompanying drawings, in which:—

Figure 1:
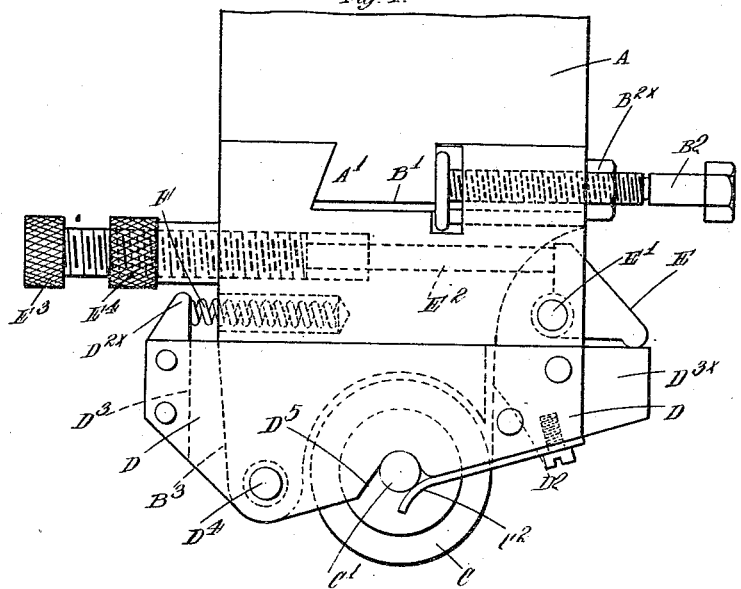
Figure 2:
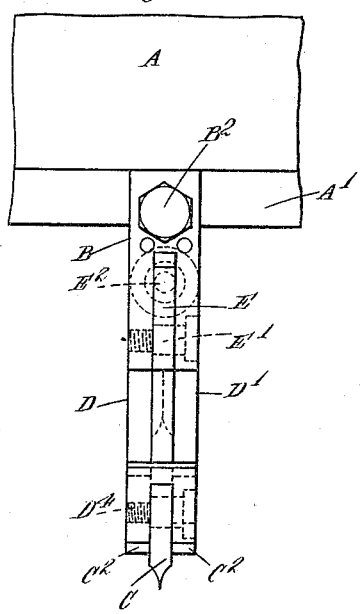

Figures 1 and 2 are respectively a side view and a front view of one construction of the improved tool.

A represents a portion of the angularly movable rail of the scoring machine, on which rail the scoring tools are supported. B represents the main body or block of one of the scoring tools, carrying the cutter C by means of a frame D pivotally mounted on the body B as hereinafter described.

The rail A is formed with a longitudinal projection A′ the front surface of the said projection being inclined as shown in Figure 1 whilst the rear surface is vertical. Each body B is formed with a groove B′ which is undercut to form an inclined surface for engaging with the inclined surface of the projection A′ and the rear part of the body carries a clamping screw B² for securing the block in the desired position on the said rail. A lock nut B²ˣ is provided on the clamping screw B² as shown in Figure 1. The scoring cutter C which as shown is in the form of a circular knife is mounted between two plates D D′ riveted or otherwise secured at the front and rear ends thereof to distance pieces D² D³ so as to form a frame which is angularly movable on a pin D⁴ supported in an extension B³ depending from the aforesaid body B and passing between the plates D D′. In the example shown the spindle C′ of the cutter C is fitted in slots D⁵ in the plates D D′, and retained therein by blade springs C², this arrangement permitting of ready attachment or removal of the cutter, whilst the slots are so shaped that the thrust on the cutter during the scoring operation is not likely to displace the cutter. The distance piece D³ at the rear of the cutter is formed with an extension D³ˣ with which a rounded or spherical end of a bell crank member E pivoted at E′ to the rear of the body is adapted to engage; the angular position of the bell crank member E can be adjusted to vary the angular position of the plates D D′ by the rod E² which is screw threaded in the front of the body B and carries at its outer and front end a milled head E³ by means of which the rod E² can be readily adjusted by the operator. A lock nut E⁴ is also provided for locking the threaded rod E² in the required position wherein it limits movement of the bell crank lever E in one direction. A spring F housed in the body B bears against an upward extension D²ˣ on the distance piece D³ so that when the screw threaded rod E² is adjusted to vary the angular position of the bell crank lever E, the plates D D′ carrying the cutter are angularly moved against the action of the spring F thus the height of the cutter from the work can be varied to produce the desired depth of cut. By reason of the spring F interposed between the upward extension $D^{2\times}$ and the body B the position of the cutter is completely determined in whichever direction the setting is made by the adjustment of the screw threaded rod $E^2$ which by means of the lock nut $E^4$ can be locked against vibration and unrequired displacement. During the scoring operation the thrust on the cutter is transmitted to the body of the tool through the said rearward extension $D^{3\times}$ engaging with the bell crank lever E which is locked against movement by the rod $E^2$ so that there is no likelihood of the thrust disturbing the adjustment. Thus the direct cutting pressure is transmitted to the body of the tool in such manner as to produce an entirely normal upward thrust on the supporting rail in whatever position the cutter frame takes. The adjustment for varying the depth of cut is effected when the body and the cutter are in the lowermost or working position in which the milled end of adjusting rod is presented at the front of the aforesaid rotatable rail. The rail A is angularly movable through an angle of 180 degrees and the longitudinal adjustment of the body B and cutter C is most conveniently effected when the cutter C is disposed above the said rail when the aforesaid adjusting screw $B^2$ is brought to the front for enabling the operator to easily make the desired longitudinal adjustment of the tool.

By means of the present invention I provide a scoring tool which is of simple construction and which is adjustable immediately by the fingers of the operator without the use of any tools and without disturbing the setting of the tool on the rail, however close the adjacent tools may be; the adjusting screws for effecting the two settings can be presented right in front of the operator in the proper position for adjustment whichever side of the rail the tool happens to be on, and in the case of the setting for depth of cut, the setting and locking is accomplished by a single screw.

What I claim and desire to secure by Letters Patent of the United States is:—

1. A scoring tool of the kind in which the tool body is mounted on an angularly movable supporting rail, comprising an adjustable cutter frame mounted on said body and carrying the cutter, means for adjusting the frame according to the required depth of cut and a transmitting member interposed between the said cutter frame and the said adjusting means, which member forms a positive stop to take the thrust due to the cutting pressure in a direction normal to the supporting rail.

2. A scoring tool of the kind in which the tool body is mounted on an angularly movable supporting rail, comprising a cutter frame pivoted on said body, an adjustable screw in said body, a movable member interposed between said screw and the cutter frame to set the cutter frame when moved by the screw according to the required depth of cut and constituting a stop or abutment for the cutter frame to take the thrust due to the cutting pressure in a direction normal to the supporting rail.

3. A scoring tool of the kind in which the tool body is mounted on an angularly movable supporting rail, comprising a cutter frame pivoted at its front end on the said body, a member pivoted on said body and bearing on the rear end of said frame, an adjusting screw in and extending from the front of said body and engaging said member to adjust the position of the said member and the cutter frame and a spring for maintaining the rear end of said cutter frame against said member.

4. A scoring tool of the kind in which the tool body is mounted on an angularly movable supporting rail, comprising a clamping member at the rear of said rail for securing the tool body in any desired position along said rail, an adjusting screw extending from the front of said body to the rear thereof, a rocking member at the rear of said body, a cutter frame pivoted on the front part of said body and a spring acting on the front part of said cutter frame to press the rear end thereof against said rocking member.

5. A scoring tool of the kind in which the tool body is mounted on an angularly movable supporting rail, comprising a clamping member for securing the body in any position along said rail, an adjusting screw extending from the front of the tool body to the rear part, a rocking member pivoted on said body and engaged by the rear end of said adjusting screw, a cutter frame pivoted on the front part of said body, a projection at the front end of said cutter frame, and a spring interposed between said projection and said body to maintain the rear end of said cutter frame against the pivoted rocking member.

6. A scoring tool of the kind in which the tool body is mounted on an angularly movable supporting rail, comprising a clamping member for securing said body in any position on said rail, an adjusting screw on said body, a pivoted rocking member on said body and engaged by said screw, a cutter frame composed of two plates secured to a forward projection, and to a rear projection, and a spring interposed between said forward projection and said body, to maintain the rear projection against said pivoted rocking member.

7. A scoring tool of the kind in which the tool body is mounted on an angularly movable supporting rail, comprising a clamping member for securing said body in any position on said rail, an adjusting screw on said body, a pivoted rocking member on said body and engaged by said screw, a cutter frame composed of two plates secured to a forward projection, and to a rear projection, and a spring interposed between said forward projection and said body, to maintain the rear projection against said pivoted rocking member, said plates being recessed to receive the cutter spindle and provided with blade springs to retain the spindle in the recesses.

JOHN IRVING NASMITH.